INVENTOR.
PETER HEINZ
GERHARD PODSCHADLY
BY

United States Patent Office 3,589,867
Patented June 29, 1971

3,589,867
METHOD AND APPARATUS FOR AUTOMATICALLY CARRYING OUT CHEMICAL ANALYSIS
Peter Heinz, Oberuhldingen, and Gerhard Podschadly, Uberlingen (Bodensee), Germany, assignors to Bodenseewerk Perkin-Elmer & Co., GmbH, Uberlingen (Bodensee), Germany
Filed June 19, 1968, Ser. No. 738,191
Claims priority, application Germany, June 24, 1967, B 93,182
Int. Cl. B65b 1/30; G01n 1/00
U.S. Cl. 23—230R
12 Claims

ABSTRACT OF THE DISCLOSURE

An apparatus for automatically carrying out chemical analysis includes a transport means for transporting sample and reagent vessels to a sample-reagent combination station and to an analysis station and means responsive to automatic sensing means for identifying the sample under analysis.

---

The present invention relates to apparatus for automatically carrying out chemical analysis.

In one form of automatic sample analysis, a transport means sequentially conveys a plurality of sample vessels past a sample treating station and an analysis station. At the analysis station the treated sample is analyzed and the results thereof for each sample is printed out in digital form.

In view of the relatively large number of samples which can be handled in a period of time by this apparatus, the possibility of improper correlation between sample identification and analysis data is disadvantageously increased.

It is an object of the present invention to provide in an apparatus of the type described a means for providing a definite correlation between the printed out results of the analysis and the individual sample identification.

Another object of the invention is to provide an improved method of sample analysis which substantially reduces the possibility of improper correlation between the analysis and identification data.

In accordance with features of the present invention, a holder for a machine-readable information carrier containing digital sample identifying data is transported together with each sample. A readout device derives the sample identifying data from the information carrier for printing out this data together with the results of analysis of an associated sample. Thus, the possibility of an incorrect correlation between sample identification data and measurement results is substantially reduced.

The general aspects of the present invention may advantageously be realized in one arrangement wherein the transport means comprises a turntable having a plurality of radial arrays and each radial array includes a reaction vessel and a sample vessel positioned at the periphery of the turntable and containing an undosed sample. A sample measuring pump is provided for conveying measured sample quantities from the sample vessel to the reaction vessel or vessels which are disposed radially inward thereof. A plurality of the sample vessels are positioned in modular assembly members which are supported on the turntable. Holders for the information carriers associated with individual samples are mounted to the exterior surface of the modular members. With this arrangement, the samples are individually positioned in the modular member and are provided with the sample identifying information carriers. As an example, in an analysis for clinical purposes, this may be done directly at the station where the possibility of confusion of the sample is relatively small.

In a particular embodiment in accordance with features of the present invention, the holder for the information carrier comprises a frame into which punched cards are inserted and the modular assembly members include peripheral grooves in superimposed relationship to the exterior surface of the modular member. A readout device is positioned at the analysis station and includes a reading head having a plurality of outwardly extending resilient fingers each aligned with one of the peripheral grooves on the modular member. The fingers are drawn by a carriage across the punched card and fingers overlaying apertures in a respective row of the punched card engage the holes and thereby rotate outwardly to effect an electrical contact. A pulse generator output is coupled with the movement of the reading head and the pulses are supplied via the electrical contacts which are actuated by the fingers.

These and other objects and features of the present invention will become apparent with reference to the following specification and drawings wherein.

Figure 10:
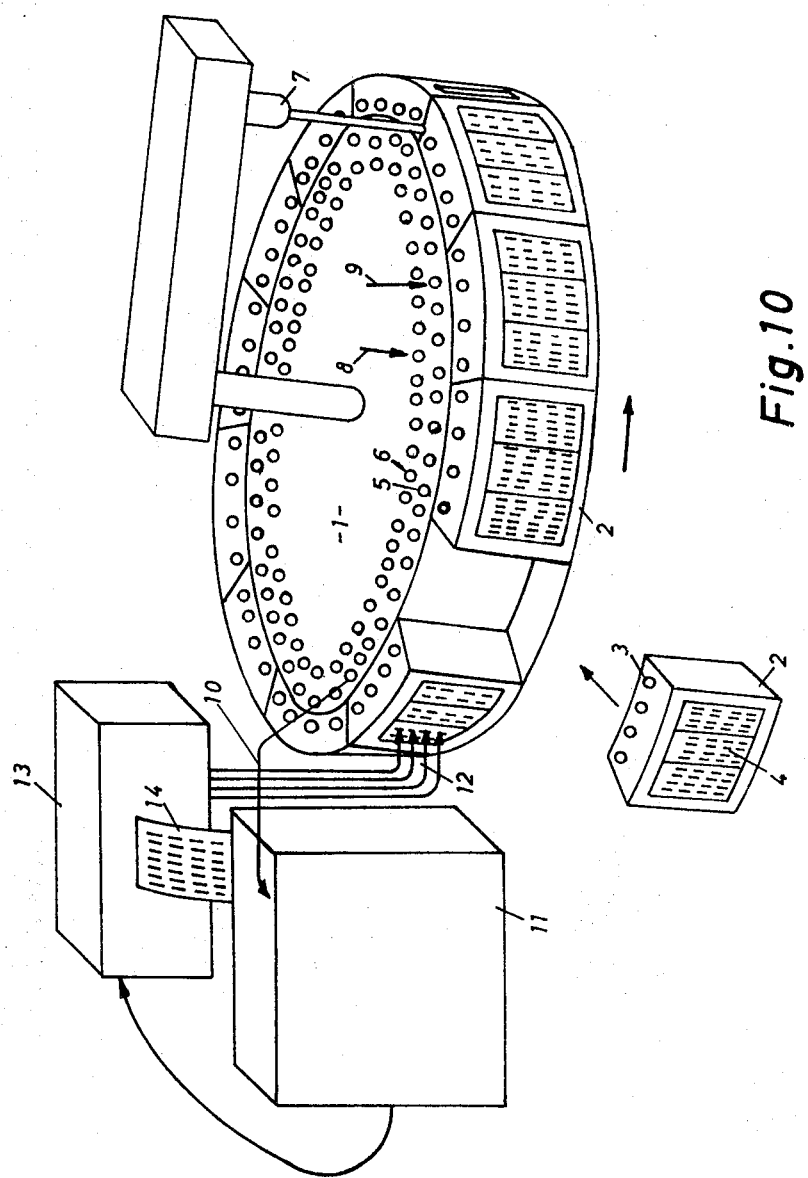
FIG. 10 is a schematic diagram of a sample analysis apparatus constructed in accordance with features of the present invention.

Referring now to FIG. 10, a transport means is shown to comprise a turntable 1 which is adapted for advancing in a stepwise manner. The turntable supports at a periphery thereof a plurality of modular assembly members 2, each having cylindrical recesses for supporting a plurality of sample vessels 3 therein. An information carrier comprising a punched card 4 which contains data used for sample identification is mounted at the periphery of the modular assembly member. Sample quantities are initially introduced into the vessels 3 of a demounted vessel member 2 and each sample is identified by an associated punched card positioned in the holder. The modular assembly member 2 is then positioned on the turntable. Reaction vessels 5 and 6 are positioned in recesses of the turntable and are aligned radially inwardly of each sample vessel 3. A pump 7 draws a quantity of sample from a sample vessel 3 when the vessel 3 is positioned at the sample reagent combining pump station. The pump delivers measured amounts of the sample to the reaction vessels 5 and 6. Reagents are introduced into the reaction vessels in measured amounts by reagent dosing pumps represented in FIG. 10 by the arrows 8 and 9. For convenience of pump positioning, the reagent dosing pump stations may be displaced circumferentially from a sample pump station 7. The reaction vessels 5 and 6 advance in a stepwise manner to an analysis station at which station the reaction product is withdrawn by suitable means 10 and conveyed to and measured by an analytical instrument such as a photometer 11. At the same time, identification data on the punched card associated with the sample and arranged radially outwardly of the reaction vessels 5 and 6 and the associated sample vessels 3 on the periphery of the assembly member 2 is read out by sensing fingers 12. A conventional printing device 13 prints on a tape 14 in a block. The sample identification thus read out which, for example, can represent a patient's identification number is printed out digitally along with the measured values obtained from the photometer 11 which for example comprises concentration values.

Figure 1:
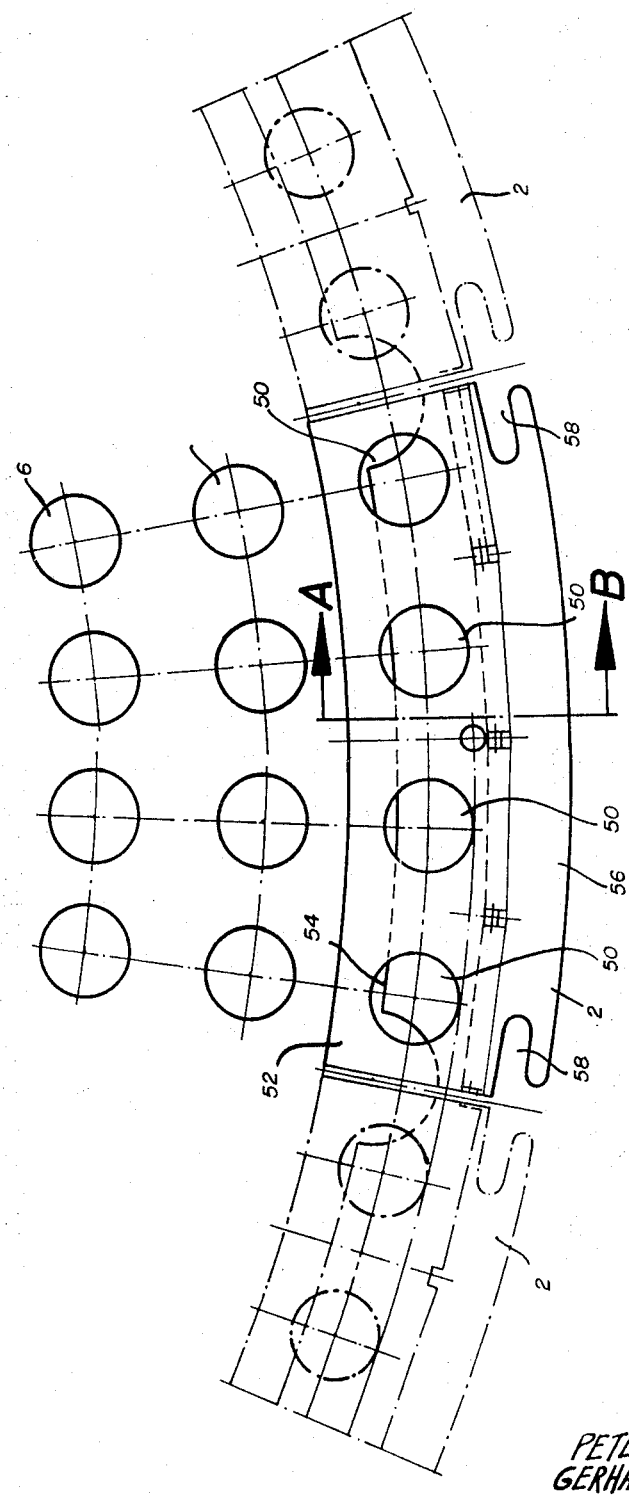
FIG. 1 is a plan view illustrating a portion of the turntable and an attached modular sample vessel-assembly member.
Figure 2:
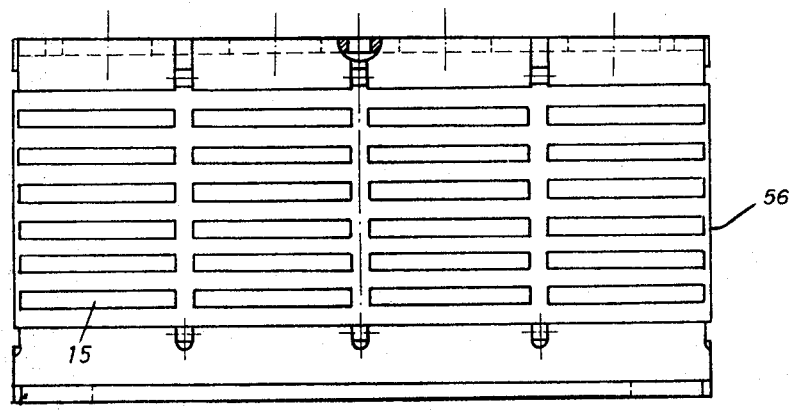
FIG. 2 is an elevation view of the assembly member of FIG. 1.
Figure 3:
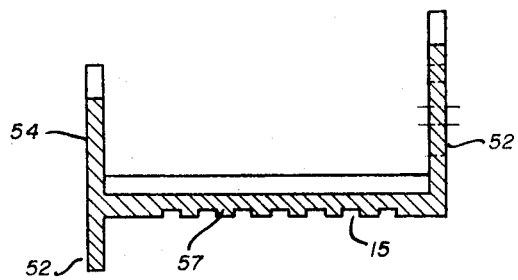
FIG. 3 is a sectional view taken along the line A–B of FIG. 1.
Figure 4:
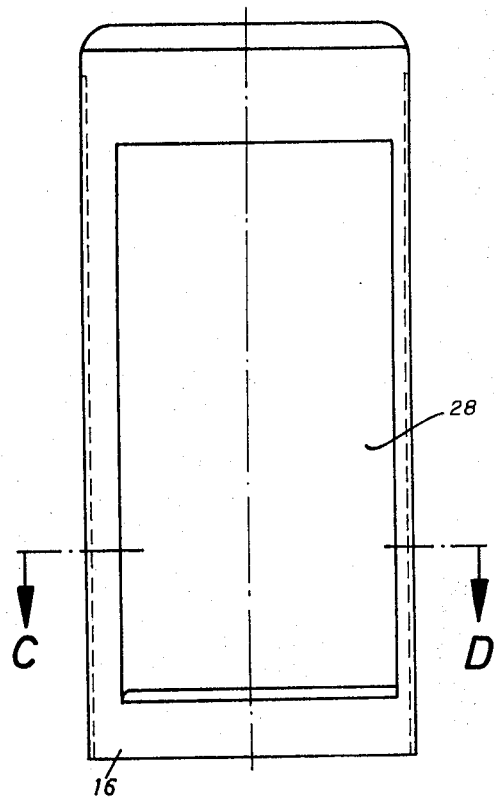
FIG. 4 illustrates a punched card holder for use with the sample vessel assembly members of FIG. 1.
Figure 5:
FIG. 5 is a sectional view taken along line C–D of FIG. 4.
Figure 6:
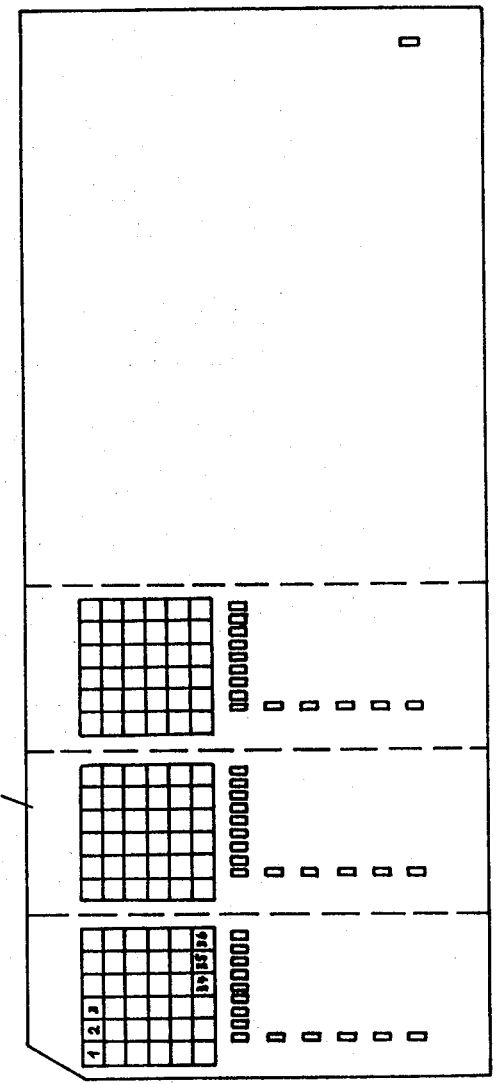
FIG. 6 illustrates punch cards used with the apparatus of this invention.

FIG. 1 illustrates in detail the modular assembly member 2 having receptacles for vessels 3 and a portion of the turntable 17. The modular member 2 is shown to comprise a support body having a plurality of apertures 50 located in an upper laterally extending segment 52 (FIG. 3). The sample vessels 3 are supported on a lower laterally extending segment 54 and are positioned in the apertures 50. A second lower laterally extending segment 56 includes a reentrance segment 58 which aligns the modular member 2 on the turntable 1. A vertical segment 57 includes peripheral grooves 15 in superimposed relationship on the arcuate peripheral segment and which in this example is arranged in four fields each corresponding to an associate one of four sample vessels. A holder for punched cards is mounted on the peripheral segment 57 of the modular unit 2. As illustrated in FIGS. 4 and 5, the holder comprises a sheet metal frame 16 having a window 28 into which the punched cards may be inserted laterally. A punched card 4 of the type utilized is illustrated in FIG. 6. It comprises a tearoff tape and contains seven lines. In the first six lines there is illustrated a six-digit figure and in each line one digit is represented by a corresponding number of equidistantly placed holes. When inserted in the carrier and mounted to modular member 2, the lines coincide spatially with the grooves 15 of the modular member.

Figure 7:
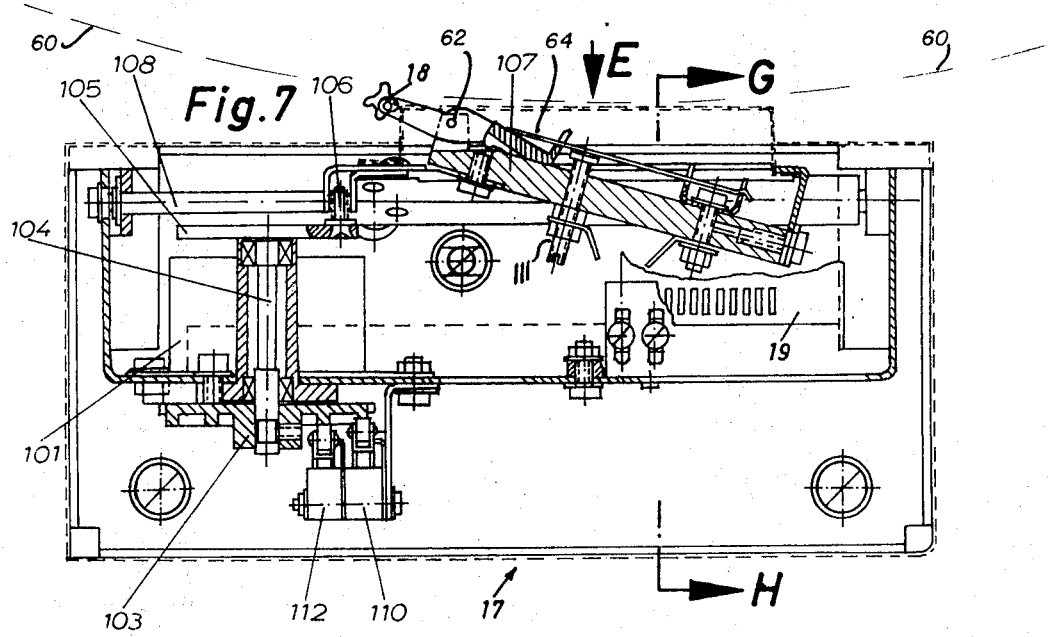
FIG. 7 illustrates a card reading head utilized with the apparatus of the present invention.
Figure 8:
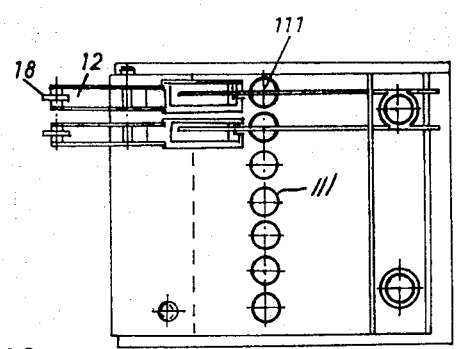
FIG. 8 illustrates a view of a reading head finger taken in the direction shown by the arrow E of FIG. 7.

When a modular unit is rotated to the analysis station, the punched card 4 is automatically read out by means of a reading head indicated generally as 17 in FIG. 7. At the analysis station the modular unit 2 is maintained stationary for a period of time for each sample while a plurality of electrical sensing elements which are supported by a movable carriage are drawn along the face of the card for one card width. In reading the card, the head engages the punched card 4 wtih each of seven of the outwardly extending sensing elements and each of these fingers is associated with one line on the punched card. FIG. 7 which is a cutaway plan view of the reading head and turntable, illustrates the path of travel of the periphery of the transported modular member by a dashed line 60. The reading fingers 12 support ta their ends sprocket wheels 18 having teeth which sequentially engage holes in the card and grooves 15 disposed therebehind as the fingers are drawn along the card. A pivot 62 is provided for the fingers 12 and as long as a sprocket wheel tooth engages a hole the sprocket wheel end of finger 12 will rotate outwardly and a contact arm 64 of a finger 12 will make electrical contact with a terminal 111.

Electrical pulses are applied through the contacts 111 to counter circuits for indicating the digital sample identification data contained on each card. These pulses are generated by an apertured plate 19 which is transported in synchronism with the fingers between a stationary source of light 20 and a photocell 21. As electrical contact is made between the arm 64 and the contact 111, pulses from the photocell 21 are supplied to an asosciate counter. Each of the counters is then supplied with as many pulses as there were holes in their respective line of the punched card 4. The contents of the counter are supplied to the printing device 13 and the figure represented by the first six lines of the punched card are thereby printed out. The seventh line data is employed for determining whether the punched card is in the correct position. By suitable means, provision is made for interrupting the application of pulses to the counter when the reading head 17 is returned to an initial position.

Figure 9:
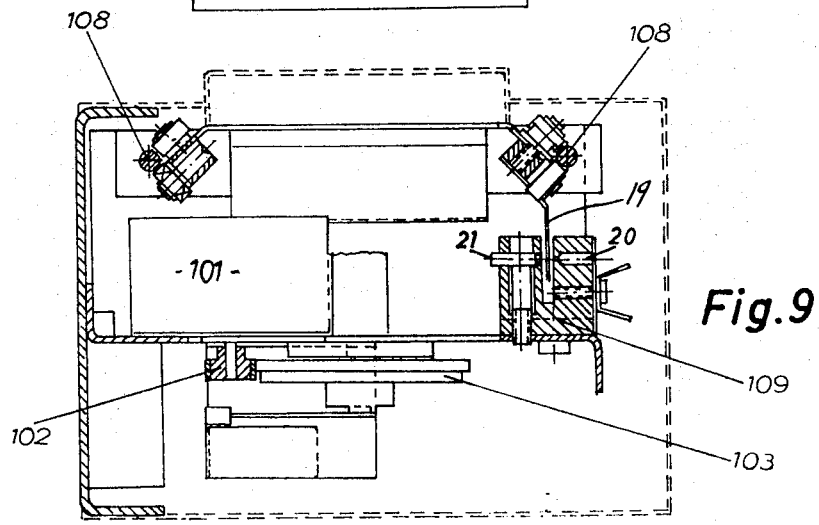
FIG. 9 is a sectional view of the reading head taken along line G–H of FIG. 7.

The arrangement for causing a reciprocal motion of the reading fingers 12 include a drive motor 101 which is controlled by the turntable and is mechanically coupled to a gear 103 by a drive pinion 102. The gear wheel 103 is fixedly connected with a disc 105 through a drive shaft 104. A pin 106 is riveted on one side of the cam disc 105 which during a cycle of rotation about its axis drives a carriage 107 over an accurately defined distance in a direction of the arrows G–H and returns the carriage to its initial position. The carriage 107 is guided between two rods 108, best seen in FIG. 9. The apertured plate 19 for generating pulses when passing through a light barrier 109 including the light source 20 and photocell 21 is also transported by the carriage 107.

As a modular member 2 is positioned at the analysis station, an interrupt microswitch 110 is automatically provided and the motor 101 is electrically energized. The carriage 107 is drawn past the modular assembly member 2. Depending on the information contained in the punched card, the contacts 111 on carriage 107 will be opened or closed. Pulses generated by the apertured plate 19 pass through the closed contacts and the number of pulses determines the figure to be printed out for a particular line. After determination of the carriage advance movement, printing is initiated by actuation by the second microswitch 112 and a cam on the gear wheel 103. The sensing action is terminated by the first microswitch 110, which after rotation of the gear wheel 103 through a full cycle of 360° is again returned to its initial position.

While we have illustrated and described a particular embodiment of our invention, it will be understood that various modifications may be made therein without departing from the spirit of the invention and the scope of the appended claims.

What is claimed is:

1. A method of sample analysis comprising:
combining a quantity of a sample and a reagent for initiating a reaction therebetween;
simultaneously transporting the sample and reaction components and identification information with the sample and reaction components to an analysis station;
analyzing a reaction product of the combined sample and reagent and forming a record of the analysis; and
automatically sensing the sample identification information and forming a record thereof in correlation with the association reaction analysis.

2. A method of sample analysis comprising:
transporting a quantity of reagent in a reagent vessel, a quantity of sample in a sample vessel and sample identification information to a reaction station;
automatically withdrawing a measured quantity of the sample from the sample vessel and combining this quantity with the reagent in the reagent vessel at the reaction station for initiating a reaction therebetween;
simultaneously transporting the reagent vessel containing the reaction components, the sample vessel, and the identification information to an analysis station;
withdrawing a quantity of a reaction product at the analysis station from the reagent vessel and analyzing the product;
forming a record indicative of the analysis; and
automatically sensing the sample identification information and forming a record thereof in correlation with the associated reaction analysis record.

3. A method of sample analysis comprising:
positioning a sample vessel containing a quantity of sample to be analyzed and identification information on a support means;
positioning the support means and a reagent vessel on a rotary transport means in predetermined spatial alignment;
rotating the transport means and transporting the reagent vessel to a reagent station;

introducing a reagent to the reagent vessel at the reagent station;

rotating the transport means and transporting the sample vessel to a reaction station;

withdrawing a measured quantity of sample from the sample vessel at the reaction station and introducing the measured quantity to the reagent vessel for initiating a reaction therebetween;

rotating the transport means and transporting the reagent vessel to the analysis station;

withdrawing a quantity of a reaction product from the reagent vessel at the analysis station and analyzing the product;

forming a record including data representative of the analysis; and automatically sensing the sample identification information at the analysis station and forming a record thereof in correlation with the associated reaction analysis record.

4. An automatic analytical apparatus having a generally circular shaped transport turntable for transporting a plurality of sample and associated reagent vessels to a station at which a quantity of the sample and the reagent are combined in a vessel and for transporting the latter vessel to an analyzing station at which a reaction product of the combined sample and reagent is analyzed and the results thereof recorded, a plurality of sample vessels positioned on said turntable along a circle near the periphery of said turntable, a plurality of reagent vessels positioned on said turntable, each of said reagent vessels radially aligned with an associated sample vessel, information carrier means bearing sample identification data disposed on said transport means in predetermined spatial relationship with respect to said reaction vessel adjacent an associated sample vessel and transportable therewith, and means positioned at said analysis station for extracting the sample identification data from said information carrier and for recording the identification data in association with the reaction analysis record.

5. The apparatus of claim 4 including means for supporting said sample vessel near the periphery of the turntable and wherein said information carrier comprises a data card bearing sample identification information in digital form and means for mounting said card to said sample support means.

6. The apparatus of claim 5 including sensing means positioned at said analysis station and adapted for movement relative to said card for sensing the digital information contained by said card.

7. The apparatus of claim 6 wherein said digital data is provided by perforations in said card and said sensing means includes contact means which are adapted for engaging said perforations and providing a corresponding output electrical indication.

8. The apparatus of claim 7 wherein said sample vessel support means comprises a demountable body having an upright arcuate shaped segment forming a peripheral surface and said card is supported against said surface.

9. The apparatus of claim 8 wherein said demountable body is adapted for supporting a plurality of sample vessels and a plurality of associate sample identification cards.

10. The apparatus of claim 9 wherein a pump means is provided at the station for withdrawing a measured amount of sample from said sample vessel and for depositing this quantity in a reagent vessel.

11. The apparatus of claim 10 wherein said peripheral surfaces include a plurality of arcuate grooves aligned with aperture locations on said card.

12. The apparatus of claim 11 wherein said sensing means includes pulse generating means adapted for applying pulses through said contacts to an associated counter, said pulse generating means comprising a light source, a photoelectric cell and apertured card transported therebetween in synchronism with said contact members.

References Cited

UNITED STATES PATENTS

| | | | |
|---|---|---|---|
| 3,193,358 | 7/1965 | Baruch | 23—230X |
| 3,266,298 | 8/1966 | Whitehead et al. | 23—253X |
| 3,320,618 | 5/1967 | Kuch et al. | 73—53X |

MORRIS O. WOLK, Primary Examiner

R. M. REESE, Assistant Examiner

U.S. Cl. X.R.

23—253; 73—423; 141—94